United States Patent [19]

Eisenberg

[11] Patent Number: 5,215,836
[45] Date of Patent: Jun. 1, 1993

[54] ALKALINE GALVANIC CELLS

[75] Inventor: Morris Eisenberg, Redwood City, Calif.

[73] Assignee: Electrochimica Corporation, Redwood City, Calif.

[21] Appl. No.: 897,296

[22] Filed: Jun. 11, 1992

Related U.S. Application Data

[63] Continuation-in-part of Ser. No. 732,159, Jul. 18, 1991, abandoned.

[51] Int. Cl.$^5$ .............................................. H01M 10/26
[52] U.S. Cl. ................................... 429/199; 429/203; 429/207
[58] Field of Search ...................... 429/203, 207, 199

[56] References Cited

U.S. PATENT DOCUMENTS

| | | | |
|---|---|---|---|
| 3,433,679 | 3/1969 | Johnson et al. | 429/207 |
| 4,224,391 | 9/1980 | Eisenberg | 429/207 |
| 4,247,610 | 1/1981 | Thornton | 429/199 |
| 4,273,841 | 6/1981 | Carlson | 429/207 X |

*Primary Examiner*—Stephen Kalafut
*Attorney, Agent, or Firm*—Kennedy & Kennedy

[57] ABSTRACT

A battery having a zinc or zinc alloy anode, a metal oxide or hydroxide cathode and an alkaline electrolyte comprising a solution of a salt formed by the reaction of boric acid, phosphoric acid or arsenic acid with an alkali or earth alkali hydroxide present in a sufficient amount to produce a stoichiometric excess of hydroxide to acid in the range of 2.5 to 11.0 equivalents per liter, and of a soluble alkali or earth or earth alkali fluoride in an amount corresponding to a concentration range of 0.01 to 1.0 equivalents per liter of total solution.

13 Claims, No Drawings

ALKALINE GALVANIC CELLS

REFERENCE TO RELATED APPLICATION

This is a continuation-in-part of application Ser. No. 732,159 filed Jul. 18, 1991 now abandoned.

TECHNICAL FIELD

This invention relates to alkaline galvanic cells of the types having zinc anodes and electrolytes which have a solution of a salt formed by the reaction of boric, phosphoric or arsenic acid with an alkali or earth alkali hydroxide.

BACKGROUND OF THE INVENTION

In U.S. Pat. No. 4,224,391, it was described that the employment of electrolytes which contain salts of strong alkali or earth alkali hydroxides with weak acids, with a slight excess of hydroxide and a pH value of between 9 and 14, reduced the solubility of zinc anode batteries. Electrolytes prepared from a mixture of alkali or earth alkali metal hydroxide solutions in water and boric acid, phosphoric acid or arsenic acid, with excess hydroxide ranging from 0.02 to 3.0 equivalents per liter of solution, produces particularly favorable anode performance. Such electrolytes substantially eliminate the dual problems of shape-charge and dendritic deposition leading to a substantial improvement in the cycle life of rechargeable alkaline batteries containing zinc anodes. In that patent the combination of the alkali or earth alkali hydroxides and selected acids or their equivalent salts, such as borates, metaborates, various phosphate or arsenate salts, was taught to result in a net stoichiometric excess of the hydroxide in the range of 0.02 to 3.0 equivalents per liter.

Considerable improvements in the charge-discharge cycle life of alkaline rechargeable batteries, such as nickel oxide-zinc batteries, have been reported based on the previous invention. See, for example, M. Eisenberg, "A new Stabilized Nickel-Zinc Battery System for Electric Vehicle Applications", Paper #830287, Soc. of Automotive Eng., Mar. 4, 1983 and M. Eisenberg and J. R. Moden, "New Stabilized Chemistry Nickel-Zinc Cells", 31st Power Sources Symp., p. 265 (Electrochem. Soc. 1984). With the new electrolyte system based on U.S. Pat. No. 4,224,391, nickel oxide-zinc cells could be cycled at 80% depth-of-discharge (D.O.D.) up to 600 or more cycles compared with a typical 50-200 cycle life for conventional cells containing 34-38% by weight potassium hydroxide solutions.

Unfortunately, as cycling proceeds of rechargeable alkaline batteries of the type disclosed in U.S. Pat. No. 4,224,391, gradually the capacity yields, expressed in ampere-hours, diminish. Typical capacity losses within 500 cycles may amount to 30-50% of the original fresh cell capacity.

Investigations have also been made combining potassium hydroxide with potassium fluoride. These are reported in Paper No. 15 of the 10th International Power Sources Symposium in Brighton, England, 1976 by N. Cenek et al and in U.S. Pat. No. 4,247,610 (1981). However, cycle life and capacity results with these have remained limited.

In the U.S. Pat. No. 4,273,841 (Carlson) a ternary electrolyte composed of potassium hydroxide (KOH), potassium phosphate ($K_3PO_4$), and potassium fluoride (KF) is proposed in concentration ranges of 5-10%, 10-20% and 5-15%, respectively. Assuming average densities of 1.28-1.37 g/cc, these concentrations can be translated in terms of molarities as follows:

KOH: 1.14-2.44 ML; $K_3PO_4$: 0.603-1.291 M/L and KF: 1.10-3.54 M/L.

These electrolytes however have been found to provide quite limited capacity of the nickel oxide electrodes, both in the beginning and later on as charge-discharge cycling proceeds.

SUMMARY OF THE INVENTION

It has now been discovered that contrary to the teachings of the prior art when one employs a phosphate salt such as $K_3PO_4$ or borate $K_3BO_3$ or $K_2NaBO_3$, in the molarity range of 0.6 to 1.3 M/L, that a much fuller realization of the capacity of the nickel-zinc cells requires that the concentrations of alkali hydroxide such as KOH must be substantially higher than that previously taught and at the same time the alkali fluorides must be substantially lower. While it is not understood why both of these changes in concentration ranges are necessary, it is believed that one beneficially affects the positive electrode and the other beneficially affects the negative electrode.

There are two preferred ways to prepare the new electrolytes. One is to create them in situ as originally described in U.S. Pat. No. 4,224,391 by reacting strong alkali or earth hydroxides with weak acids such as boric, phosphoric or arsenic acid and providing an excess of that hydroxide within specified limits or by mixing the corresponding alkali neutral salts with the three alkali hydroxides such as KOH, in the same amounts as the specified excess molarity ranges. For example, to prepare an electrolyte which is 1.0 M/L $K_3PO_4$ 3 M/L KOH, one can directly employ the two compounds in the above concentrations or combine 1 M/L of the acid $H_3PO_4$ with 6 M/L KOH ($3 \times 1$ M/L+3 M/L).

A ternary electrolyte system with an alkali hydroxide content of between 2.5 M/L and 11 M/L in combination with phosphate and borate salts in the range of 1.3-2.5 M/L, and in further combination with alkali or earth alkali metal fluorides in the limited concentration range of 0.01 to 1.00 M/L, produces new electrolytes with unexpectedly and substantially increased capacity yields of nickel-zinc cells.

The addition of limited quantities not exceeding the range of 0.01-1.00 M/L of fluorides of alkali or earth alkali metals which are soluble in electrolytes that contain salts or strong alkali or earth alkali hydroxides with weak acids, such as boric, phosphoric or arsenic acid hydroxides, with an excess of the hydroxide, of at least 2.5 M/L, substantially enhances the capacity retention of alkaline zinc-anode containing cells, as cycling proceeds.

In a preferred form of the invention, an electrolyte is provided for a battery having zinc or a zinc alloy as an active anodic material and a metal oxide or hydroxide as an active cathodic material. The electrolyte is alkaline and is formed of an alkali or earth alkali metal hydroxide mixed with boric acid, phosphoric acid or arsenic acid to produce an excess of hydroxide in the range of 2.50-11.0 equivalents per liter of solution. The solution also includes dissolved alkali or earth alkali fluorides in a concentration of between 0.01 to 1.0 equivalents per liter of the total electrolyte solution. The electrolytes can also be prepared by using directly the alkali metal borate, phosphate and arsenic salts as long as the hydroxide concentration is in the range of 2.5–11.0 equivalents per liter (or M/L).

DETAILED DESCRIPTION

Experiment I

Two electrolytes designated as K-1 and K-2 were prepared in accordance with this invention as shown in Table 1. The KOH concentration was 2.56 M/L, in both. The potassium phosphate, $K_3PO_4$, was 1.66 and 1.47 M/L, respectively and the amounts of potassium fluoride, KF, was limited to 0.34 and 0.68 M/L, respectively. In addition, an electrolyte was prepared as specifically described in claim 5 of U.S. Pat. No. 4,273,841 of Carlson. The weight percentages given there have been recalculated into molarities as shown in Table 1. It should be noticed that the KOH molarity of 177 is well below the range specified in the present invention, which is 2.5–11 M/L, and that the KF concentration of 2.74 M/L is also well above the upper limit of the KF range of the present invention, which is 0.01–1.00 of M/L.

Four ampere-hour nominal capacity nickel-zinc cells employing four double nickel-oxide cathodes were constructed each 1.7×1.75 inches in size and 0.035 inches thick. The cells were assembled with zinc anodes of the same size and a separator system of non-woven nylon and microporous polyethylene film. Groups of three cells each were filled correspondingly with electrolytes K-1, K-2 (prepared according to this invention) and electrolyte NC-101 prepared according to U.S. Pat. No. 4,273,841. All cells were vacuum-filled and allowed to stand for three days to assure good wetting of the plates. After initial charging cells were discharged at 1 amp to a 1 volt cut-off point. The experiment covered many cycles, the first eight of which are summarized in Table 1.

TABLE 1

COMPARISON OF CAPACITY YIELDS OF NICKEL-OXIDE-ZINC-CELLS FILLED WITH 3 ELECTROLYTES
Compositions based on average density of 1.327 g/cc

|  | Electrolyte #K-1 (according to this invention) | | Electrolyte #K-2 (according to this invention) | | Electrolyte #N C-101 (according to Pat. 4,273,841) | |
| --- | --- | --- | --- | --- | --- | --- |
| KOH | 2.56 | 10.32% | 2.56 | 10.82% | 1.77 | 7.5% |
| $K_3PO_4$ | 1.66 | 22.03% | 1.47 | 19.51% | 1.00 | 16% |
| KF | 0.34 | 1.49% | 0.68 | 2.98% | 2.74 | 12% |

| | Amp Capacities delivered in discharge to a 1.0 v/cell cut-off | | |
| --- | --- | --- | --- |
| Cycle | | | |
| #1 | 4.8–5.35 AH | 4.3–525 AH | 1.75–2.05 AH |
| #2 | 4.6–4.9 AH | 4.9–5.1 AH | 2.00–2.9 AH |
| #3 | 4.65–5.2 AH | 4.65–5.2 AH | 2.1–2.4 AH |
| #4 | 4.2–5.3 AH | 4.2–4.7 AH | 2.5–3.2 AH |
| #8 | 4.5–4.8 AH | 4.5–4.8 AH | 1.9–2.2 AH |

As can be seen in the first cycle, the group of K-1 filled-cells yielded 4.8–5.35 amp hours (AH). The K-2 group yielded 4.3–5.25 AH. However, the NC-101 group yielded 1.75–2.05 AH. In Cycle 2, this last group delivered a slightly better capacity of 2 to 2.9 AH, but still far below the 4.6–5.1 AH values for groups K1 and K2. Even after eight cycles, this situation did not change and in subsequent cycling the capacity yields of the cells in the last group remained in the range of 1.9 to 2.2 AH compared to 4.5 to 4.8 for electrolytes K1 and K2 prepared in accordance with the present invention.

Experiment II

An electrolyte was prepared from an 8.08 moles per liter (8.08 chemical equivalents per liter) solution of potassium hydroxide to which boric acid was added in the amount of 1.50 moles per liter (4.50 chemical equivalents per liter). This provided formation of a solution of 1.50 moles per liter of potassium borate and a 3.58 moles per liter of excess potassium hydroxide. This solution was designated as Solution #1. To Solution #1 was added potassium fluoride (KF) in an amount which resulted in a 0.8 moles per liter concentration. This solution was designated as Solution #2. Finally, a conventional potassium hydroxide solution of 34% by weight of KOH which corresponds to 8.08 moles per liter was prepared and designated as Solution #3.

TABLE 2

| Solution | Content | Cycle No. | Average Capacity, AH | |
| --- | --- | --- | --- | --- |
| 1 | KOH | 8 | 4.1 | |
| | Borate | 30 | 3.7 | |
| | | 92 | 3.0 | (75%) |
| 2 | KOH | 8 | 3.9 | |
| | Borate | 30 | 3.8 | |
| | KF | 92 | 3.7 | (93%) |
| 3 | KOH | 8 | 4.3 | |
| | Only | 30 | 3.5 | |
| | | 92 | (shorted) | |

It is clear from these results that after 92 cycles the Solution #1 gave an 80% capacity retention but solution #2 with both borate and KF gave a 93% retention. The KOH Solution #3 resulted in cells shorting by zinc dendrites before cycle 92 was reached. Hence, the combination of the potassium hydroxide and borate and potassium fluoride (as represented by Solution #2) yielded the best retention of cell capacity after the extended cycling even so the capacity may have been somewhat lower in the initial cycle, for instance, in Cycle #8.

Experiment III

In this experiment larger nickel oxide zinc cells of a nominal capacity of 16–20 ampere-hours (AH) were employed. Again, three solutions were employed. Solution #4 contained 1.9 moles per liter (m/L) of potassium borate and 2.6 m/L potassium hydroxide. Solution #5 contained 0.8 m/L potassium fluoride (KF) and 3.3 m/L potassium hydroxide (KOH). Solution #6 contained 0.8 m/L potassium fluoride 2.8 m/L KOH and 0.9 m/L borate ($K_3BO_3$) In addition, all three of these solutions contain 0.2 m/L lithium hydroxide (LiOH). Three groups of three cells each were cycled at 80% depth of discharge using a 9 hour charge and 3 hour discharge. Table 3 gives the average cell capacities after a number of cycles.

TABLE 3

| AVERAGE NICKEL ZINC CELL CAPACITIES (AH) | | | |
| --- | --- | --- | --- |
| Cycle No. | Solution 4 | Solution 5 | Solution 6 |
| 4 | 20 AH | 8.7 AH | 10.4 AH |
| 79 | 19 AH | 13 AH | 16 AH |
| 188 | 19 AH | 18 AH | 22 AH |
| 283 | 17 AH | 20 AH | 23 AH |

From this it is clear that the combination of the three constituents, as represented by Solution #6, gave the best overall results except in the initial cycle. Particularly impressive were the results after cycle #79.

Experiment IV

Two groups of three nickel zinc cells, each as described in Experiment III, were filled with Solution #1 from Experiment II, KOH and borate and a modified Solution #7 containing in addition 0.3 M/L phosphate, $K_3PO_4$ and 0.3 M/L sodium fluoride (NaF). The two groups of cells were cycled to a 100% DOD. At cycle #137 the group with Solution #1 showed an average 74% capacity retention. However, the group with Solution #7 averaged an 85% retention of cell capacity.

Experiment IV

Nine small silver oxide-zinc cells of a nominal capacity of 500 milliampere-hours (ma) were divided into three groups of 3 cells each and after the second discharge, subjected to automatic cycling to an 80% depth DOD. The first group of three cells was filled with Solution #8 which contained 11.6 M/L KOH. A solution #9 contained 9.3 M/L KOH and 0.5 M/L $K_3BO_3$. Finally, a solution #10 in the third group contained 9.3 M/L KOH, 0.5 $K_3BO_3$ and 0.12 M/L potassium fluoride. The results of the tests are given in Table 4.

TABLE 4
AVERAGE CAPACITIES (ma) OF SILVER-ZINC CELLS FOR THREE ELECTROLYTES (80% DOD)

|  | Solution 8 | Solution 9 | Solution 10 |
|---|---|---|---|
| Compositions M/L | KOH 11.6 | KOH 9.3<br>$K_3BO_3$ 0.5 | KOH 9.3<br>$K_3BO_3$ 0.5<br>KF 0.12 |
| Cycle # |  |  |  |
| 2 | 650 mAH | 600 mAH | 580 mAH |
| 13 | 504 | 565 | 585 |
| 63 | 120 & 2 shorted | 510 | 556 |
| 123 | — | 392 (65%) | 430 (74%) |

As can be seen Solution #8 with potassium hydroxide only (KOH) gave in the initial cycle #2 the highest capacity. However, by cycle #13 it already dropped from 650 to 504 ma and by cycle #63 one cell delivered only 120 mAH and two cells were already shorted. Since the 45% KOH solution is a currently accepted standard for silver oxide zinc cells, the effects of the borate and fluoride additives in Solutions #9 and #10 can be appreciated. As shown in Table 4, these two groups average capacities still in excess of 500 ma in cycle #63 and even in cycle #123 delivered respectable fractions of original capacity. In this generally low cycle life rechargeable battery system, it is also interesting to note that Solution #10, containing both the fluoride and the borate, provided in cycle #123, at 75% capacity retention compared to 65% for the Solution #9 with only the borate. It should also be noted that with KOH alone silver oxide-zinc cells rarely exceed 40–60 cycles at 80% DOD.

Experiment VI

Two groups of similar cells as described in experiment 4 were filled with electrolytes 8 and 11, the compositions of which are given in Table 6. The cells were subject to full discharge, i.e. 100% DOD.

TABLE 6
AVERAGE CAPACITIES (ma) OF SILVER-ZINC CELLS WITH TWO ELECTROLYTES-CYCLED 100% DOD

|  | Solution 8 | Solution 11 |
|---|---|---|
| Composition m/L | KOH 11.6 | KOH 9.5 |
|  |  | $K_3BO_3$ 0.5 |
| Cycle # |  |  |
| 3 | 636 ma | 610 ma |
| 17 | 505 | 550 |
| 57 | 0.170 (shorted) | 460 |
| 93 | — | 363 |

The group with the Solution #8 (standard) did not reach cycle #57, failing by dendrite shorting. The group with Solution #11 with borate survived at least to cycle #93, at which point it still averaged a capacity of 363 ma.

It should be understood that the just described embodiments merely illustrate principles of the invention in its preferred forms. Many modifications, additions, and deletions may, of course, be made thereto without departure from the spirit and scope of the invention as set forth in the following claims.

I claim:

1. A battery having an anode, a cathode and an electrolyte with the anode having zinc or a zinc alloy as an active anodic material, the cathode having a metal oxide or hydroxide as an active cathodic material, and the electrolyte comprising a solution of a first salt formed by the reaction of one or more acids selected from the group consisting of boric acid, phosphoric acid and arsenic acid with an alkali or earth alkali hydroxide present in an amount to produce a stoichiometric, excess of said hydroxide to said acid in the range of 2.5 to 11.0 equivalents per liter, and a solution of a second salt which is a soluble alkali or earth alkali fluoride in an amount corresponding to a concentration range of 0.01 to 1.0 equivalents per liter of total solution.

2. A battery in accordance with claim 1 wherein said first salt is selected from the group consisting of potassium borate, potassium metaborate, sodium borate, sodium metaborate, potassium phosphate, potassium metaphosphate, sodium phosphate, sodium metaphosphate, potassium arsenate, potassium meta-arsenate, sodium arsenate and sodium meta-arsenate.

3. A battery in accordance with claim 1 in which said second salt is selected from the group consisting of lithium fluoride, sodium fluoride, potassium fluoride, cesium fluoride and barium fluoride.

4. A battery in accordance with claim 1 wherein said hydroxide is potassium hydroxide.

5. A battery in accordance with claim 1 wherein said hydroxide is sodium hydroxide.

6. A nickel-oxide zinc battery in accordance with claim 1 wherein said electrolyte comprises from 4.5 to 10 equiv/Liter of potassium hydroxide, from 2.0 to 6.0 equiv/Liter boric acid or sodium metaborate and from 0.01 to 1.00 equivalents of potassium fluoride.

7. A battery in accordance with claim 1 wherein said electrolyte comprises 8.5 equiv/Liter of potassium hydroxide, 0.2 equiv/Liter lithium hydroxide, from 2.0 to 6.0 equiv/Liter of said acid and 0.3 to 1.0 equiv/Liter of potassium fluoride.

8. A silver oxide-zinc battery in accordance with claim 1 wherein said electrolyte comprises from 6.0 to 11.0 equiv/Liter of potassium hydroxide, from 0.1 to 3.6 equiv/Liter of a salt selected from the group consisting of potassium borate, sodium potassium borate and potassium phosphate and of a fluoride selected from the group consisting of sodium, potassium and cesium fluoride in the concentration range of 0.01 to 0.20 equiv/Liter.

9. The method of making an electrolyte for a battery having a zinc anode and a metal oxide or hydroxide cathode which includes the step of mixing an acid selected from the group consisting of boric acid, phosphoric acid and arsenic acid with an alkali or earth alkali metal hydroxide in proportion to achieve an electrolyte having a stoichiometric excess of hydroxide in the range of 2.50 to 11.0 equiv/Liter and to which is added a soluble alkali or earth alkali fluoride in amount ranging from 0.01 to 1.0 equiv/Liter.

10. An electrolyte for a battery made in accordance with the method of claim 9.

11. A battery having a zinc anode, a metal oxide or hydroxide cathode and the electrolyte of claim 10.

12. The method of making an electrolyte in accordance with claim 9 wherein the acid is mixed with an hydroxide selected from the group consisting of potassium hydroxide, sodium hydroxide, lithium hydroxide and mixtures thereof.

13. The method of making an electrolyte in accordance with claim 9 wherein a hydroxide selected from the group consisting of sodium hydroxide and potassium hydroxide is mixed with boric acid in a concentration range of from 8.5 to 12 equiv/liter hydroxide to 10 and 6.0 chemical equivalents of said acid, the stoichiometric excess of the hydroxide being in the range of 2.50 to 11.0 equiv/Liter.

* * * * *